UNITED STATES PATENT OFFICE 2,382,038

TRIHALO-TETRAHYDRONORPOLYCYCLO-PENTADIENES

Herman A. Bruson, Philadelphia, Pa., assignor to The Resinous Products & Chemical Company, Philadelphia, Pa., a corporation of Delaware No Drawing. Application February 20, 1943,
Serial No. 476,644

10 Claims. (Cl. 260—648)

This invention relates to trihalo-tetrahydro-norpolycyclopentadienes and a method for their preparation.

It is known that dicyclopentadiene reacts with halogens to form extremely unstable addition products which split off hydrogen halide and resinify when warmed, and which are unstable even at ice-bath temperature. (Roscoe, Liebig's Annalen der Chemie, 232, 349 (1886).)

However, in accordance with the disclosure of the present application, which is a continuation-in-part of copending application Serial No. 434,262, filed March 11, 1942, well-defined, relatively stable trihalogen derivatives are obtained from dicyclopentadiene, tricyclopentadiene, and higher polycyclopentadienes having two double bonds per molecule by first adding a member of the group consisting of hydrogen chloride, hydrogen bromide, or hydrogen iodide to one of the double bonds of the polycyclopentadiene molecule, to form an addition-rearrangement product having the norpolycyclopentadiene ring system as hereinafter more fully described, and subsequently reacting the norpolycyclopentadiene monohydrohalide thus formed with a halogen having an atomic weight greater than that of fluorine, whereby the remaining double bond becomes saturated by taking up two halogen atoms.

Typical polycyclopentadienes which can be used for the purpose of this invention are, for example, dicyclopentadiene, tricyclopentadiene, tetracyclopentadiene, pentacyclopentadiene, homologues and isomers thereof containing two double bonds per molecule. Such polymers are crystalline solids obtainable by heating cyclopentadiene at 150°–200° C. in a closed vessel. They possess the general formula:

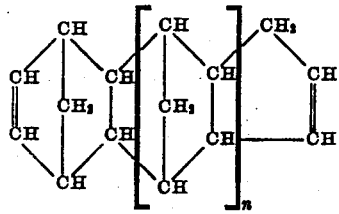

wherein $n$ is zero or a small integer such as 1, 2, or 3. These polycyclopentadienes contain two double bonds and one to four endomethylene cycles per molecule.

I have found that only one double bond of the two present in the above polycyclopentadienes reacts with hydrogen chloride, hydrogen bromide, or hydrogen iodide even when an excess of these acids is employed, that the addition occurs on the double bond of the cycle having the endomethylene bridge, and that a simultaneous molecular rearrangement takes place in this ring to form a hitherto unknown class of cyclic compounds having the norpolycyclopentadiene ring system as more fully described in copending application Serial No. 476,641, filed February 20, 1942.

The reaction between dicyclopentadiene and hydrogen halide in the presence of water is generically shown by the equation:

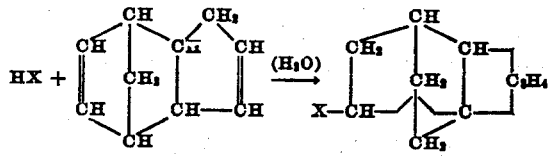

wherein $C_3H_4$ is a propenylene group which conjointly with the adjoining carbon atoms forms a cyclopenteno group. The cyclopenteno group may have the structure:

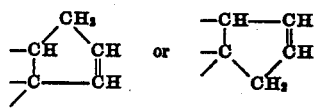

In the addition of halogen to the halodihydronorpolycyclopentadienes, the cyclopenteno group becomes saturated, as shown below.

In an analogous manner, tricyclopentadiene reacts only on the double bond of the endomethylene cycle with simultaneous rearrangement of the latter.

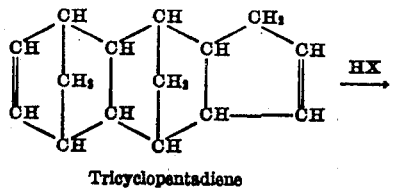

Tricyclopentadiene

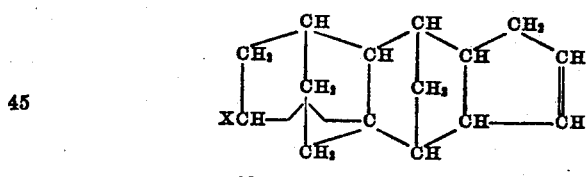

Nortricyclopentadiene monohydrohalide

Similarly, tetracyclopentadiene and pentacyclopentadiene add hydrogen halides to form norpolycyclopentadiene monohydrohalides.

The addition of hydrogen chloride, hydrogen bromide, or hydrogen iodide to dicyclopentadiene or higher polycyclopentadienes takes place readily at 50°–110° C. in the presence of water to yield the norpolycyclopentadiene monohydrohalides having a terminal five-membered cycle containing a double bond. This addition is most conveniently performed with ordinary concentrated aqueous hydrochloric acid (35%), hydrobromic acid (48%) or hydriodic acid (47%) but both stronger and weaker solutions of the hydrogen halides may be used. The reaction takes place in a few hours under the influence of rapid stirring.

The addition of chlorine or bromine to the above norpolycyclopentadiene monohydrohalides takes place with great ease even at 0° C. and is complete in a short time at 20°–25° C. In order to inhibit undue substitution it is advantageous to employ an inert solvent, such as, for example, carbon tetrachloride, as a reaction medium and to maintain the temperature below 30° C. although both higher and lower temperatures may be used. Iodine adds very slowly to the double bond and is advantageously employed as iodine monochloride or iodine monobromide. As a result of these reactions, dicyclopentadiene, for example, yields trihalo-tetrahydronordicyclopentadienes having the formula:

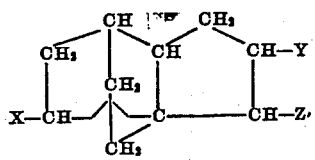

Tricyclopentadiene in the same manner yields trihalo-tetrahydronortricyclopentadienes having the formula:

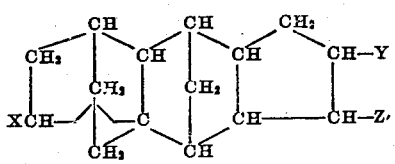

In each of the above formulae X, Y, and Z represent one or more kinds of halogen atoms having atomic weights greater than 19. Analogous products can be made from the higher polycyclopentadienes.

All of these trihalo-tetrahydronorpolycyclopentadienes are new compounds, which are liquids or low melting solids yielding liquids of high boiling point. Many of them can be distilled under reduced pressure without decomposition or resinification. They may find application as plasticizers for polyvinyl chloride, synthetic rubber, rubber hydrochloride and other types of plastics. They also possess insecticidal properties and are useful intermediates for the preparation of the corresponding glycols, amines, esters, nitriles, thiocyanates and many other types of organic compounds. They may be added to lubricating oils to improve their oiliness and load-bearing properties.

The following examples illustrate this invention. The parts given are by weight.

*Example 1*

Chlorine was passed into a solution of 84 parts of nordicyclopentadiene monohydrochloride and 84 parts of carbon tetrachloride at 10°–20° C. until the gain in weight amounted to 50 parts. The product was washed with water, then with dilute soda solution and finally with water. The dried oil was then distilled in vacuo after evaporation of the solvent. The trichloro-tetrahydronordicyclopentadiene

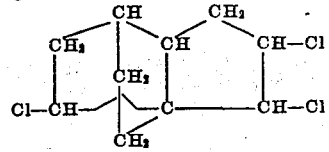

was obtained as an almost colorless oil. It distilled at 143°–153° C./2 mm. and upon redistillation boiled at 175°–180° C./11 mm. The yield was 98 parts.

The nordicyclopentadiene monohydrochloride used boils at 100°–102° C./11 mm.

*Example 2*

To a solution of 84 parts of nordicyclopentadiene monohydrochloride in 84 parts of carbon tetrachloride 80 parts of bromine was added gradually during one hour while the reaction mixture was stirred and cooled to 5° C. The product was washed with water, then dilute soda solution, and finally with water, and evaporated to remove the solvent. The residual oil weighing 159 parts was distilled in vacuo. The dibromo-monochloro-tetrahydronordicyclopentadiene

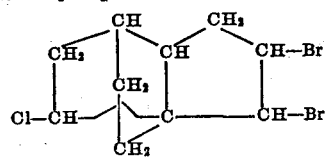

distilled at 165–173° C./2 mm. as a pale yellow viscous liquid in a yield of 138 parts. Upon redistillation it boiled at 191°–194° C./11 mm.

*Example 3*

To a solution of one molecular equivalent of nordicyclopentadiene monohydriodide in an equal volume of carbon tetrachloride cooled to 0° C. one mol of chlorine was introduced. The product was washed with water, dried, and the solvent removed by evaporation. The oily residue consisted essentially of dichloro-iodotetrahydronordicyclopentadiene

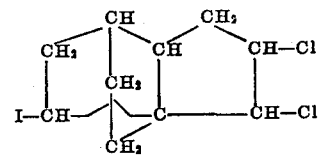

The nordicyclopentadiene monohydriodide used boils at 130°–132° C./11 mm.

*Example 4*

A solution of 73 parts of nordicyclopentadiene monohydrobromide in 73 parts of carbon tetrachloride was stirred at 5°–10° C. during one and one-half hours while chlorine was introduced until a weight increase of 20 parts occurred. The product was then washed with water and soda solution, followed again by water, and finally dried at 100° C. under reduced pressure. The residual oil weighing 89 parts was distilled in vacuo. The bromodichloro-tetrahydronordicyclopentadiene

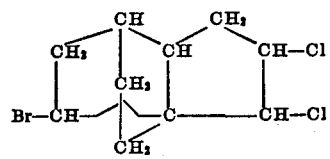

distilled at 156° C./3 mm. as a pale yellow thick oil.

The nordicyclopentadiene monohydrobromide used boils at 113–114° C./11 mm.

Example 5

To a solution of 42.6 parts of nordicyclopentadiene monohydrobromide in 50 parts of carbon tetrachloride, cooled to 10° C. and stirred, there was added dropwise during 30 minutes a solution of 32 parts of bromine in 50 parts of carbon tetrachloride. The mixture was then stirred for 15 minutes longer and finally washed with water, dilute soda solution, and then again with water. The carbon tetrachloride was removed by evaporation, eventually under reduced pressure. The residual viscous oil weighing 71 parts consisted essentially of tribromo-tetrahydronordicyclopentadiene

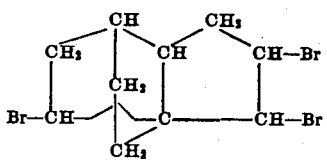

Example 6

(a) Into a solution of 235 parts of nortricyclopentadiene monohydrochloride in 250 parts of carbon tetrachloride cooled to 10° C. chlorine was introduced until the gain in weight was 70 parts. The solvent was removed by evaporation in vacuo at 100° C. The residual oil consisted essentially of trichlorotetrahydronortricyclopentadiene having the formula

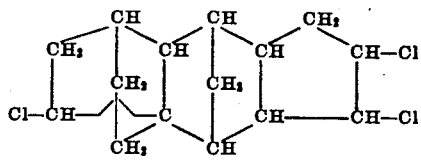

The nortricyclopentadiene monohydrochloride used is a pale yellow liquid boiling at 175° C./11 mm.

(b) By using 160 parts of bromine in the above reaction in place of the chlorine, the corresponding chloro-dibromotetrahydronortricyclopentadiene having the formula

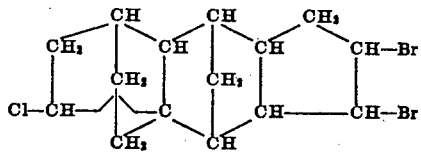

was obtained as a thick oil.

Example 7

500 parts of dicyclopentadiene is heated in a sealed vessel at 180° C. for 8 hours. The waxy solid obtained, consisting essentially of tricyclopentadiene, tetracyclopentadiene, pentacyclopentadiene and higher polycyclopentadienes, was mixed with twice its weight of aqueous fuming hydrochloric acid and stirred rapidly at 100°–110° C. for 12 hours. The oil layer was separated, washed, dried, extracted with its own volume of hot carbon tetrachloride, filtered hot, and the filtrate treated at 20° C. with chlorine in subdued light until the solution was saturated. The solvent was then evaporated under reduced pressure. The residual semi-solid product consisted essentially of the mixed trichlorotetrahydronortri-, tetra-, and pentacyclopentadienes.

As is evident from the foregoing, the trihalides of the tetrahydronorpolycyclopentadienes may contain three atoms of the same halogen or any combination of chlorine, bromine, and iodine in any of three positions.

These products may be represented by the following probable formula

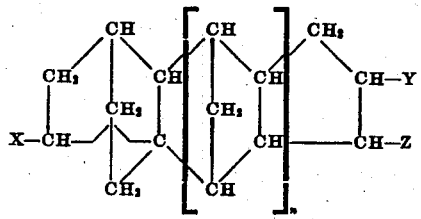

wherein X, Y, and Z represent one or more kinds of halogen atoms having atomic weights greater than 19 and $n$ is a number from zero to a small whole number.

While in the above examples pure or relatively pure polycyclopentadiene or mixtures thereof are shown for purposes of illustration, there may also be used as a source of polycyclopentadienes having two double bonds per molecule mixtures of hydrocarbons containing 5% or more of these polycyclopentadienes. Such mixtures are obtained from various processes involving thermal cracking of petroleum oils. The reaction of the polycyclopentadienes as shown above provides a new means of separating some of the components of mixtures and gives a new utility thereto.

I claim:

1. A trihalotetrahydronorpolycyclopentadiene, all halogen atoms of which have atomic weights above nineteen, said product being obtained by adding in the presence of water a hydrohalide to a polycyclopentadiene having two double bonds and one to four endomethylene cycles per molecule, with subsequent rearrangement to form a halodihydronorpolycyclopentadiene having a terminal cyclopenteno group, and adding at a temperature below about 30° C. two halogen atoms to saturate said cyclopenteno group.

2. A trihalotetrahydronordicyclopentadiene, all halogen atoms of which have atomic weights above nineteen, said product being obtained by adding a hydrohalide to dicyclopentadiene in the presence of water, with subsequent rearrangement to form a halodihydronordicyclopentadiene having a terminal cyclopenteno group, and adding at a temperature below about 30° C. two halogen atoms to saturate said cyclopenteno group.

3. A trichlorotetrahydronordicyclopentadiene, a compound obtained by adding hydrogen chloride to dicyclopentadiene in the presence of water, with subsequent rearrangement to form chlorodihydronordicyclopentadiene having a terminal cyclopenteno group, and adding at a temperature below about 30° C. chlorine to saturate said cyclopenteno group.

4. Bromodichlorotetrahydronordicyclopentadiene, a compound obtained by adding hydrogen bromide to dicyclopentadiene in the presence of water, with subsequent rearrangement to form bromodihydronordicyclopentadiene having a terminal cyclopenteno group, and adding at a temperature below about 30° C. chlorine to saturate said cyclopenteno group.

5. Chlorodibromotetrahydronordicyclopentadiene, a compound obtained by adding hydrogen chloride to dicyclopentadiene in the presence of water, with subsequent rearrangement to form chlorodihydronordicyclopentadiene having a terminal cyclopenteno group, and adding at a temperature below about 30° C. bromine to saturate said cyclopenteno group.

6. A method for preparing trihalotetrahydronorpolycyclopentadienes which comprises reacting by addition in the presence of water a crystalline polycyclopentadiene having two double bonds and one to four endomethylene cycles per molecule and a hydrogen halide, the halogen of which has an atomic weight above nineteen, to yield an addition product, forming by rearrangement of said addition product a halodihydronorpolycyclopentadiene having a terminal cyclopenteno group, and adding to the cyclopenteno group of said halodihydronorpolycyclopentadiene at a temperature below about 30° C. two equivalents of halogen of atomic weight greater than nineteen.

7. A method for preparing trihalotetrahydronordicyclopentadienes which comprises reacting by addition in the presence of water dicyclopentadiene and a hydrogen halide, the halogen of which has an atomic weight above nineteen, to yield an addition product, forming by rearrangement of said addition product a halodihydronordicyclopentadiene having a terminal cyclopenteno group, and adding to the cyclopenteno group of said halodihydronordicyclopentadiene at a temperature below about 30° C. two equivalents of halogen of atomic weight greater than nineteen.

8. A method for preparing trichlorotetrahydronordicyclopentadiene which comprises reacting by addition in the presence of water hydrogen chloride and dicyclopentadiene, to yield an addition product which rearranges to chlorodihydronordicyclopentadiene having a terminal cyclopenteno group, and adding to the cyclopenteno group of said chlorodihydronordicyclopentadiene at a temperature below about 30° C. two equivalents of chlorine.

9. A method preparing bromodichlorotetrahydronordicyclopentadiene which comprises reacting by addition in the presence of water hydrogen bromide and dicyclopentadiene, to yield an addition product which rearranges to bromodihydronordicyclopentadiene having a terminal cyclopenteno group, and adding to the cyclopenteno group of said bromodihydronordicyclopentadiene at a temperature below about 30° C. two equivalents of chlorine.

10. A method of preparing chlorodibromotetrahydronordicyclopentadiene which comprises reacting by addition in the presence of water hydrogen chloride and dicyclopentadiene, to yield an addition product which rearranges to chlorodihydronordicyclopentadiene having a terminal cyclopenteno group, and adding to the cyclopenteno group of said chlorodihydronordicyclopentadiene at a temperature below about 30° C. two equivalents of bromine.

HERMAN A. BRUSON.